UNITED STATES PATENT OFFICE.

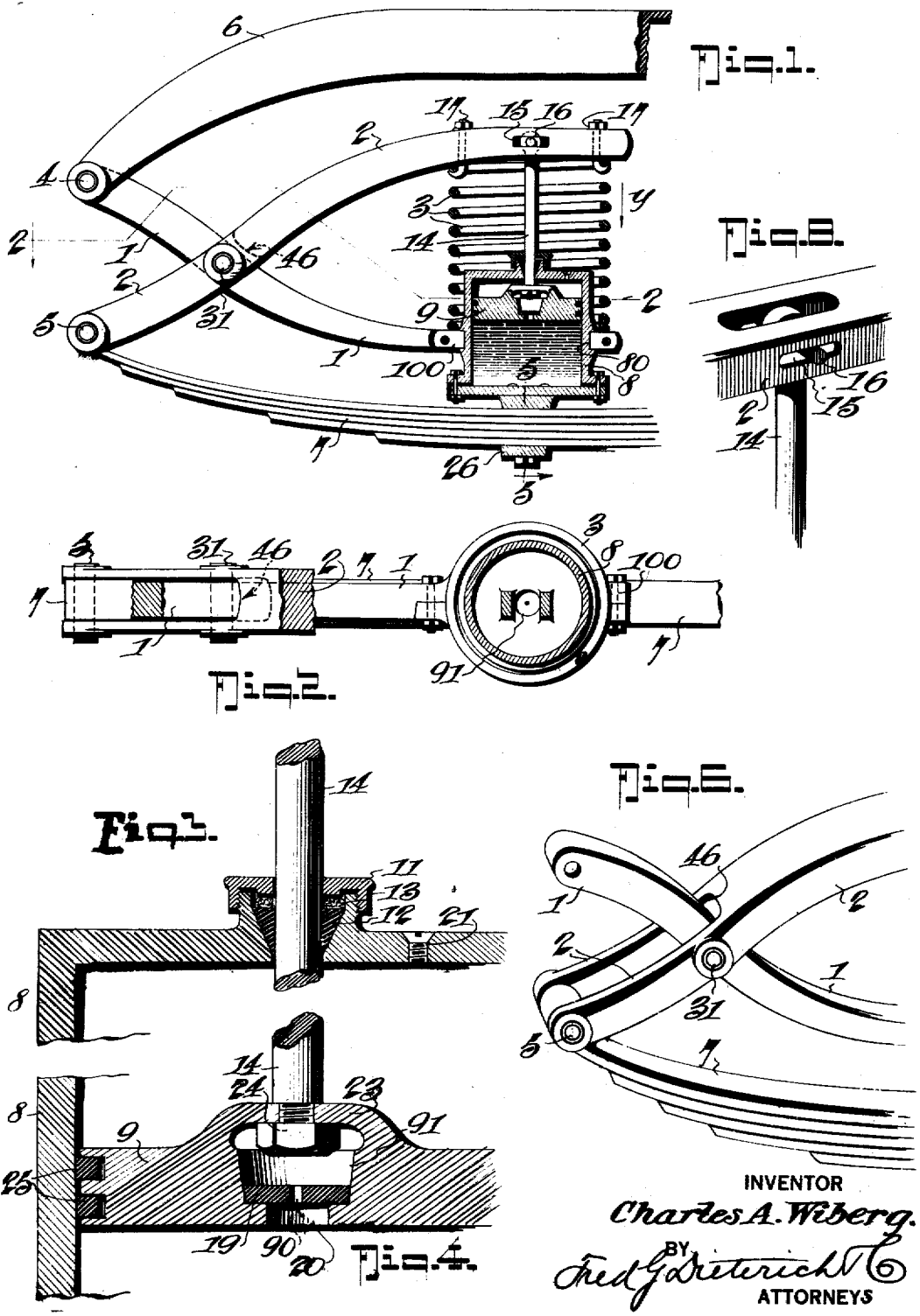

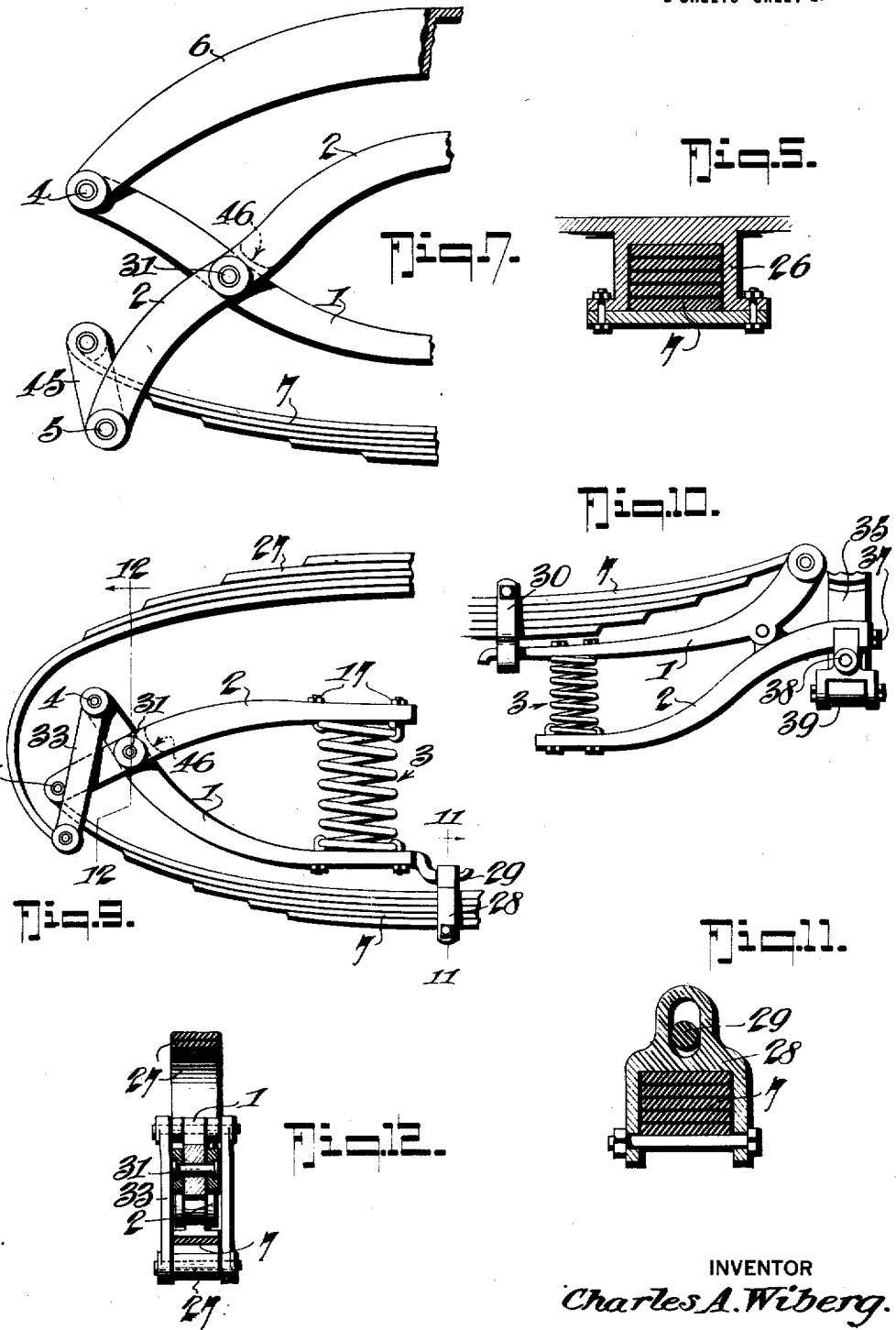

CHARLES A. WIBERG, OF DULUTH, MINNESOTA, ASSIGNOR OF ONE-FIFTH TO OSCAR W CHALLSTROM, OF DULUTH, MINNESOTA.

SHOCK-ABSORBER.

1,319,937.    Specification of Letters Patent.    Patented Oct. 28, 1919.

Application filed May 12, 1919. Serial No. 296,474.

*To all whom it may concern:*

Be it known that I, CHARLES A. WIBERG, a citizen of the United States, residing at Duluth, in the county of Saint Louis and State of Minnesota, have invented certain new and useful Improvements in Shock-Absorbers, of which the following is a specification.

My invention has for its purpose to provide an improved construction of shock absorbing means adapted to be interposed between the regular or main leaf spring of an automobile and the frame supported by the said main spring and which is designed to increase the cushioning effect desired to be obtained when the vehicle frame moves in relation to its running gear and thereby prevent the violent depression and rebound of the said frame, when the running gear encounters depressions in the road bed.

Another object of my invention is to provide an improved shock absorber, of the general character stated, that may be readily and easily applied to vehicles of common constructions without material changes of existing parts and which includes the embodiment of devices that operate to so increase the cushioning effect as the depression or rebound increases, that the shock will be gradually absorbed without a sudden check in the movement of the vehicle frame.

With the foregoing objects and other purposes in view which will appear in the following detailed description of the parts that constitute my invention, my said invention resides in the peculiar combination and arrangement of the said parts and the details of construction thereof hereinafter explained, and specifically pointed out in the appended claims, it being understood that changes and modifications of the precise construction of my invention as herein set forth, may be made without departing from my said invention as comes within the scope of the appended claims and as illustrated in the accompanying drawings; in which:

Figure 1 is a front elevation of a portion of the left hand end of a motor vehicle frame with my shock absorber operatively mounted thereon, parts of the auxiliary cushioning devices being shown in section.

Fig. 2 is a detail horizontal section thereof on the line 2—2 on Fig. 1.

Figs. 3 and 4 are detail vertical sections of parts of the auxiliary devices of the shock absorber hereinafter specifically referred to.

Fig. 5 is a detail section on the line 5—5 on Fig. 1.

Fig. 6 is a detail perspective view of the outer end of the pivotally connected crossed arms and illustrates the connection with the corresponding end of the main leaf spring.

Fig. 7 is a face view that illustrates a slightly modified shape of the cross member that connects with the leaf spring and hereinafter again referred to.

Fig. 8 is a detail perspective view that illustrates the shiftable connection between the piston rod and the upper member of the pivot or crossed levers.

Fig. 9 is a side elevation of a somewhat modified form of my invention.

Fig. 10 illustrates a further modification of my invention, the latter construction being especially provided for use in connection with the side and back springs of the vehicle.

Fig. 11 is a detail cross section taken on the line 11—11 on Fig. 9.

Fig. 12 is a detail sectional view taken on the line 12—12 on Fig. 9.

Referring now more particularly to Figs. 1 to 8, which illustrate the preferred construction of my shock absorber, 6 designates a portion of an automobile chassis frame and 7 the main leaf spring between which and the frame 6 my shock absorbing devices are interposed, which devices, in the said preferred form, include a stout coil spring 3 that is mounted between the inner ends of a pair of opposing crossed lever arms 1 and 2, pivotally connected, by a pin 31, in a manner best shown in Fig. 6 which also illustrates the outer or lower end of the arm 2 as bifurcated to straddle the outer or upper end of the member 1.

The inner end of the bifurcation constitutes a shoulder 46 that prevents the arms 1 and 2 from spreading too much.

The end of arm 2 is pivotally connected, by a pin 5, to an eye at the outer end of the main spring, the end of the other arm 1 being likewise joined by the pivot pin 4 to the outer or horn end of the chassis frame portion 6.

In practice, the several pivot pins 31, 5 and 4 are provided with the usual attached grease cups (not shown).

In the modification shown in Fig. 7, the end of arm 2 has a more abrupt curve than in the other form of said arm, whereby to provide for pivotally connecting with a hanger 45 that is needed for connecting the arm with some types of the main spring 7.

When the parts are arranged, as best shown in Fig. 1, the buffer or auxiliary spring 3 is securely connected at the top to the upper or inner end of the arm 2 by the clamp bolts 17—17, its bottom end being fixedly supported upon the horizontal ring-like inner end of the arm 1 and which includes a half circle clamping member 100, the purpose of which will presently appear.

In the preferred form, the auxiliary cushioning means includes a spring checker which is in the nature of a dash pot consisting of a cylindrical casing 8 formed with an annular groove 80 which provides for firmly holding the cylinder within the ring end of the arm 1, which end includes the semi-circular clamping member 100 that engages the cylinder groove 80, as is best shown in Fig. 2.

The cylinder 8 is also firmly mounted in the upright position upon and secured to the main spring 7 by a coupling 26 which straddles the said spring, see Fig. 5.

When the parts are operatively assembled, the cylinder 8 is filled with oil and receives a plunger 9 of special construction, best shown in Fig. 4, by reference to which it will be observed the said plunger 9 has a central opening 90 surrounded at the top by a socket-like valve seat 91 in which plays a disk valve 19 having a central restricted aperture 20 for the passage of the oil, or other fluid contained in the cylinder.

The small aperture 19 in the valve disk provides for the fluid passing slowly from beneath the piston 9, that is, not as fast as the spring 3 requires on its rebound or expansion, to thereby check or cause the spring 3 to rise or expand slowly back to its normally extended position.

25—25 designate the piston packing rings and 23 a cage frame that bridges over the central valve 19 and its seat, and the said cage frame constitutes the means for connecting with the lower end of the piston rod 14, which end has a step bearing and is threaded to engage the cage frame and to receive the clamp nut 24, as shown.

The piston rod 14 passes through a gland on the casing top, which gland, in the construction shown in detail in Fig. 3, includes a conical packing chamber closed by a screw cap 11.

12 and 13 designate fiber and metal packing fillings, respectively, that tend to automatically tighten about the rod 14 as fast as it wears.

21 indicates a screw plug closed filling aperture in the top of the cylinder 8.

The upper end of the piston rod 14 is yieldingly connected to the inner end of the arm 2 to allow the said upper end of the rod 14 to swing laterally, as may be necessary as the arm 2 is forced downwardly in the direction of the arrow $y$ on Fig. 1, and, for such purpose, the arm 2 has a horizontal slot 15 that merges in an elongated vertical slot in which the flattened extremity of the rod 14 plays and which is connected with the arm 1 by a cross bolt 16 whose opposite ends ride in the slot 15, as shown.

The use and operation of my shock absorber, when developed in the preferred form, hereinbefore described, is as follows:

It is well understood by those skilled in the art to which this invention relates that the main leaf spring used in automobile suspension has obvious limitations.

If sufficiently strong to carry the weight of the vehicle and protect the parts from road shocks, it is more or less unaffected by minor shocks or vibrations. If such main spring is so flexible that it is sensitive to minor shocks, then it is not strong enough to adequately sustain the load, under great stress.

Efforts have been made, with more or less success, to remedy the objections noted by interposing in the spring suspension, auxiliary devices in the nature of coil springs, which operate in connection with the main spring suspension and the vehicle chassis on the body.

In my preferred construction mentioned, in passing over the rough places or road depressions, the minor shocks are readily taken care of by the spring 3, as the cross arm 2 closes toward the opposing arm 1 and thereby effects compression of the said spring 3.

By combining with the said spring 3, a checker device, in the nature of a dash pot, the shocks incident to the deflection and rebound of the spring and the disagreeable shocks or stops usually incident in the up or rebound movement of the vehicle, is absorbed by the said checker device, it being understood the plunger 9 on the down thrust is cushioned by the constantly increasing compression of the fluid beneath it, which fluid during such compression partially but slowly passes into the top of the cylinder, back of the piston.

As the axle rebounds and the spring 3 tends to expand and resume its substantially normal position, the fluid back of the piston 9, which at best passes to the under side of the piston very slowly, operates to check an instantaneous expansion of the spring, since its rebound or expansion depends upon the escape of the fluid from the back to the front side of the plunger 9, such operation of the parts mentioned tending, in a very effective and positive manner, to absorb the violent shocks imparted to the running gear and to cushion or deaden such shocks without producing violent reaction.

For some of the lighter weight automobiles, the checking device, before referred to, may be omitted and only the auxiliary spring 3 used, for example as in the modified form shown in Fig. 9, which illustrates the arm 1 connected to a link 33 that pivotally joins with the downwardly and inwardly curved end of an upper main spring 27, or, if necessary, to the chassis frame section like 6 in Fig. 1, which has its end extended to connect with the lower end of the link 33.

In the latter form, the inner end of the arm 1 is substantially fixedly secured to the main spring 7 by a yoke clamp 30 that is secured to the main spring 7, see Figs. 9 and 11, and which has an eye 28 at the upper end to receive the hook-shaped end 29 of the arm 1.

The spring 3 is interposed between the opposing inner ends of the arms 1 and 2 to which the upper and lower portions of the spring 3 are secured by the clip clamps 17—17, as shown.

In Fig. 10, I have illustrated a further modification of my invention and, in this latter form, the construction shown in Fig. 9, so far as it relates to the suspension of the spring 3, is utilized.

In the arrangement shown in said Fig. 10, the cross arm 1 is pivotally connected at one end by a bolt 36 to the corresponding outer end of the main side spring 7 and the inner end thereof is attached to the said spring by a straddle clamp 30, as in Fig. 9, while the outer end of the arm 2 is connected to the adjacent end by a main or back spring 35 by the connections 37, 38 and 39, as will be clearly understood from the drawings.

From the foregoing description taken in connection with the drawings, it is believed that the complete construction, the manner of operation and the advantages of my invention will be readily apparent and need not be further referred to.

What I claim is:

1. In combination with an overhead support, and the main leaf spring, a shock absorber comprising a pair of crossed and pivotally connected lever arms, one of the said arms having its outer ends pivotally connected to the corresponding end of the main spring, a link connection that joins the outer end of the other arm with the overhead support at a point below the pivotal connection of the said arms, the inner end of the arm connected to the overhead support being fixedly connected to the main spring, and a coil spring interposed between the inner ends of the said crossed lever arm.

2. In combination with an overhead support, and the main leaf spring, a shock absorber comprising a pair of crossed and pivotally connected lever arms, one of the said arms having its outer end pivotally connected to the corresponding end of the main spring, a link connection that joins the outer end of the other arm with the overhead support at a point below the pivotal connection of the said arms, the inner end of the arm connected to the overhead support being fixedly connected to the main spring, and a coil spring interposed between the inner ends of the said crossed lever arms, the said overhead support consisting of a leaf spring whose outer end terminates in a horn that extends below the pivotal connection of the crossed levers and to which the link connection that joins one of the lever arms and the said overhead support is pivotally connected.

3. In a shock absorber of the character described, the combination with the regular main leaf spring and an overhead support upon which the vehicle body rests, a lever pivoted at one end to the main spring, a second lever pivotally connected to the first lever, the second lever having its outer end pivotally connected to the outer end of the overhead support, and its inner end fixedly connected to the main spring and a yielding connection interposed between the opposite inner ends of the two levers.

4. In a shock absorber of the character described, the combination with the regular main leaf spring and an overhead support upon which the vehicle body rests, a lever pivoted at one end to the main spring, a second lever pivotally connected to the first lever, the second lever having its outer end pivotally connected to the outer end of the overhead support, and its inner end fixedly connected to the main spring and a yielding connection interposed between the opposite inner ends of the two levers, the said yielding connection consisting of a coiled spring whose opposite ends engage the said opposing inner ends of the levers, and a checking device coöperative with the said spring and the said inner ends of the levers for cushioning the rebound of the spring, the said device comprising a dash pot mounted on the main leaf spring and having its plunger rod extended through the upper end of the coiled spring, and a pivotal connection between said rod and the adjacent free end of said first mentioned lever.

5. In a shock absorber of the character described, the combination with the regular main leaf spring and an overhead support upon which the vehicle body rests, a lever pivoted at one end to the main spring, a second lever pivotally connected to the first lever, the second lever having its outer end pivotally connected to the outer end of the overhead support, and its inner end fixedly connected to the main spring and a yielding connection interposed between the opposite inner ends of the two levers, the said yielding connection consisting of a coiled spring whose opposite ends engage the said opposing inner ends of the levers, and a checking device coöperative with the said spring and the said inner ends of the levers for cushioning the rebound of the spring, the said checking device including a cylinder fixedly mounted on the main leaf spring with its upper end extended within the coiled spring, a plunger having a central opening and a disk having a small fluid passage, said disk operating as a valve to close over the said central opening, when the plunger rises on the rebound of the spring, a plunger rod and a pivotal connection that joins the said rod and the adjacent lever arm.

CHARLES A. WIBERG.